United States Patent
Fu et al.

(10) Patent No.: US 12,548,926 B2
(45) Date of Patent: Feb. 10, 2026

(54) ELECTRICAL CONNECTION TERMINAL AND BATTERY PACK SIGNAL ACQUISITION DEVICE

(71) Applicant: Tyco Electronics (Shanghai) Co., Ltd., Shanghai (CN)

(72) Inventors: Xiaozhi (George) Fu, Shanghai (CN); Wei (Rock) Lv, Shanghai (CN); Wei Zhang, Shanghai (CN); Dingbing (Frank) Fan, Shanghai (CN); Xiang Li, Shenzhen (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 321 days.

(21) Appl. No.: 18/476,473

(22) Filed: Sep. 28, 2023

(65) Prior Publication Data

US 2024/0106141 A1 Mar. 28, 2024

(30) Foreign Application Priority Data

Sep. 28, 2022 (CN) .......................... 202211192329.3

(51) Int. Cl.
*H01R 12/58* (2011.01)
*H01R 4/02* (2006.01)
*H01R 43/16* (2006.01)

(52) U.S. Cl.
CPC ........... *H01R 12/585* (2013.01); *H01R 4/029* (2013.01); *H01R 43/16* (2013.01)

(58) Field of Classification Search
CPC ....... H01R 12/585; H01R 4/029; H01R 43/16
USPC ......................................................... 439/876
See application file for complete search history.

(56) References Cited

U.S. PATENT DOCUMENTS

2017/0338520 A1\* 11/2017 Lim ..................... H01R 25/165
2019/0029133 A1\* 1/2019 Schramme ............ H01M 10/48

\* cited by examiner

*Primary Examiner* — Sean Gugger
(74) *Attorney, Agent, or Firm* — Barley Snyder

(57) ABSTRACT

An electrical connection terminal includes a welding part welded to a solder pad of a battery pack cell to be electrically connected to the battery pack cell, a press fitting part pressed into a hole on a battery pack signal acquisition board to be electrically connected to the battery pack signal acquisition board, and an elastic part connected between the welding part and the press fitting part. The press fitting part is elastically floated in a length direction of the electrical connection terminal relative to the welding part.

20 Claims, 5 Drawing Sheets

ELECTRICAL CONNECTION TERMINAL AND BATTERY PACK SIGNAL ACQUISITION DEVICE

CROSS-REFERENCE TO RELATED APPLICATIONS

This application claims the benefit of the filing date under 35 U.S.C. § 119(a)-(d) of Chinese Patent Application No. 202211192329.3, filed on Sep. 28, 2022.

FIELD OF THE INVENTION

The present invention relates to an electrical connection terminal used for electrical connection between a battery pack cell and a battery pack signal acquisition board, as well as a battery pack signal acquisition device including the electrical connection terminal.

BACKGROUND

In order to achieve electrical connection between a battery pack cell and a battery pack signal acquisition board, it is generally necessary to first connect the battery pack cell to a flexible printed circuit board using a cable, then connect the flexible printed circuit board to a bus connector through a flexible flat cable, and finally connect it to the battery pack signal acquisition board through a bus connector. This leads to a long data transmission path between the battery pack cells and the battery pack signal acquisition board, which increases costs and reduces signal transmission quality.

SUMMARY

An electrical connection terminal includes a welding part welded to a solder pad of a battery pack cell to be electrically connected to the battery pack cell, a press fitting part pressed into a hole on a battery pack signal acquisition board to be electrically connected to the battery pack signal acquisition board, and an elastic part connected between the welding part and the press fitting part. The press fitting part is elastically floated in a length direction of the electrical connection terminal relative to the welding part.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
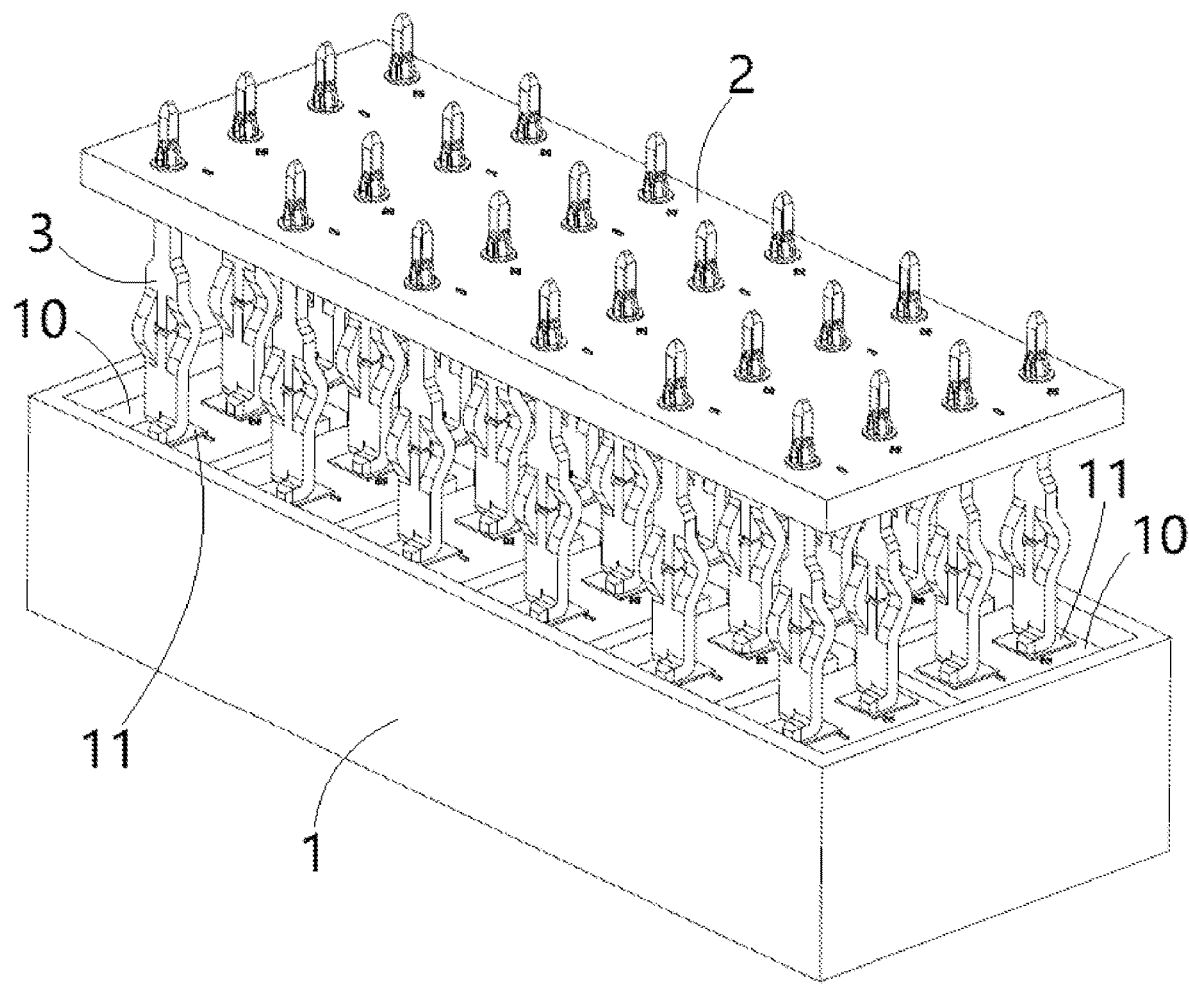
FIG. 1 is an illustrative perspective view of a battery pack signal acquisition device according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1 to 5, in an exemplary embodiment of the present invention, an electrical connection terminal 3 is disclosed. The electrical connection terminal 3 includes a welding part 31, a press fitting part 32, and an elastic part 33. The welding part 31 is welded to a solder pad 11 of a battery pack cell 10 for electrical connection with the battery pack cell 10. The press fitting part 32 is pressed into a hole 21 on a battery pack signal acquisition board 2 to electrically connect with the battery pack signal acquisition board 2. The elastic part 33 is connected between the welding part 31 and the press fitting part 32, so that the press fitting part 32 can be elastically floated in the length direction Y of the electrical connection terminal 3 relative to the welding part 31.

Figure 2:
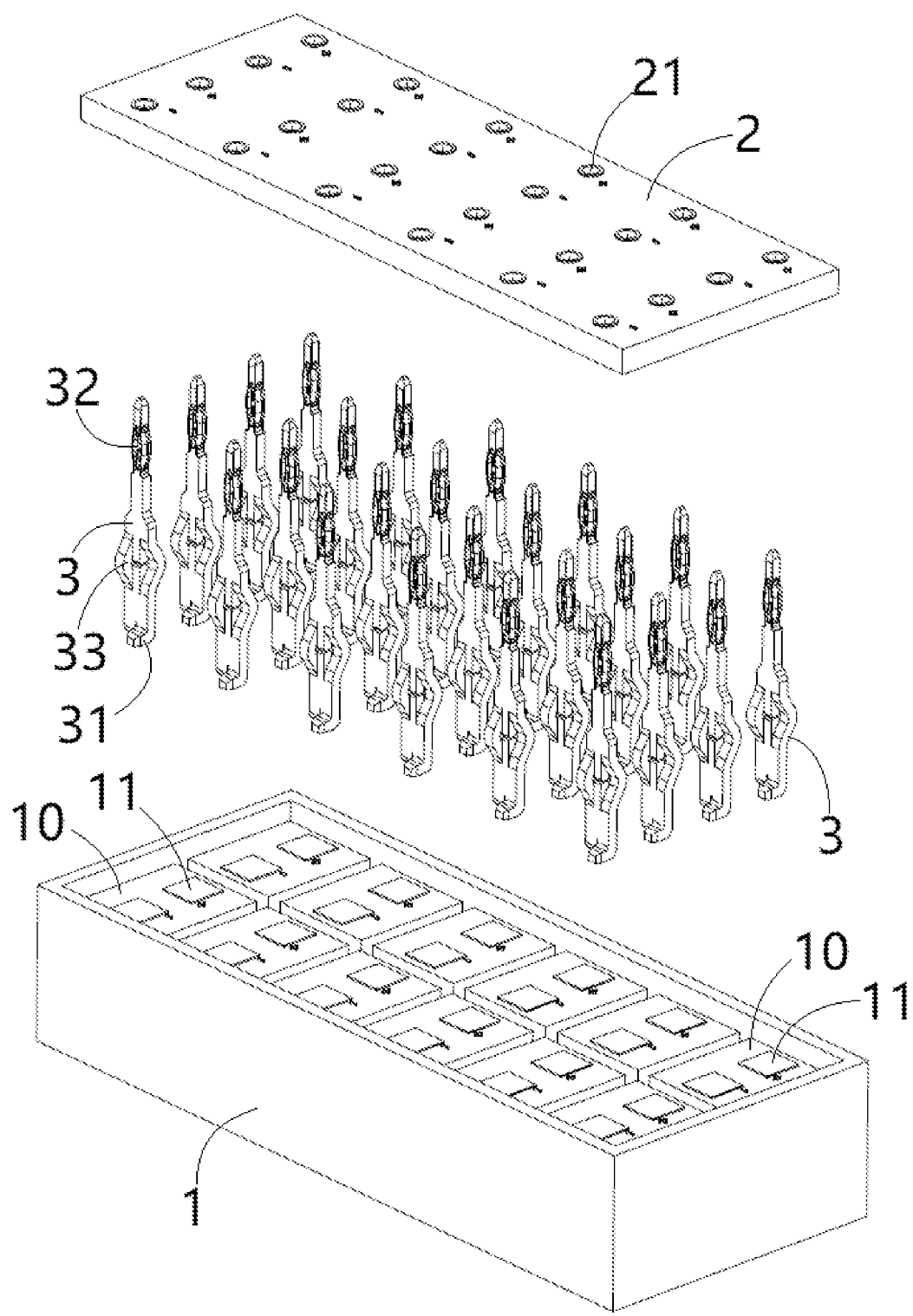
FIG. 2 is an illustrative exploded view of a battery pack signal acquisition device according to an exemplary embodiment of the present invention.

As shown in FIGS. 1 and 2, in the illustrated embodiments, the battery pack 1 on a new energy vehicle typically includes multiple battery pack cells 10, which are arranged in groups to supply power to the electric motor.

Figure 3:
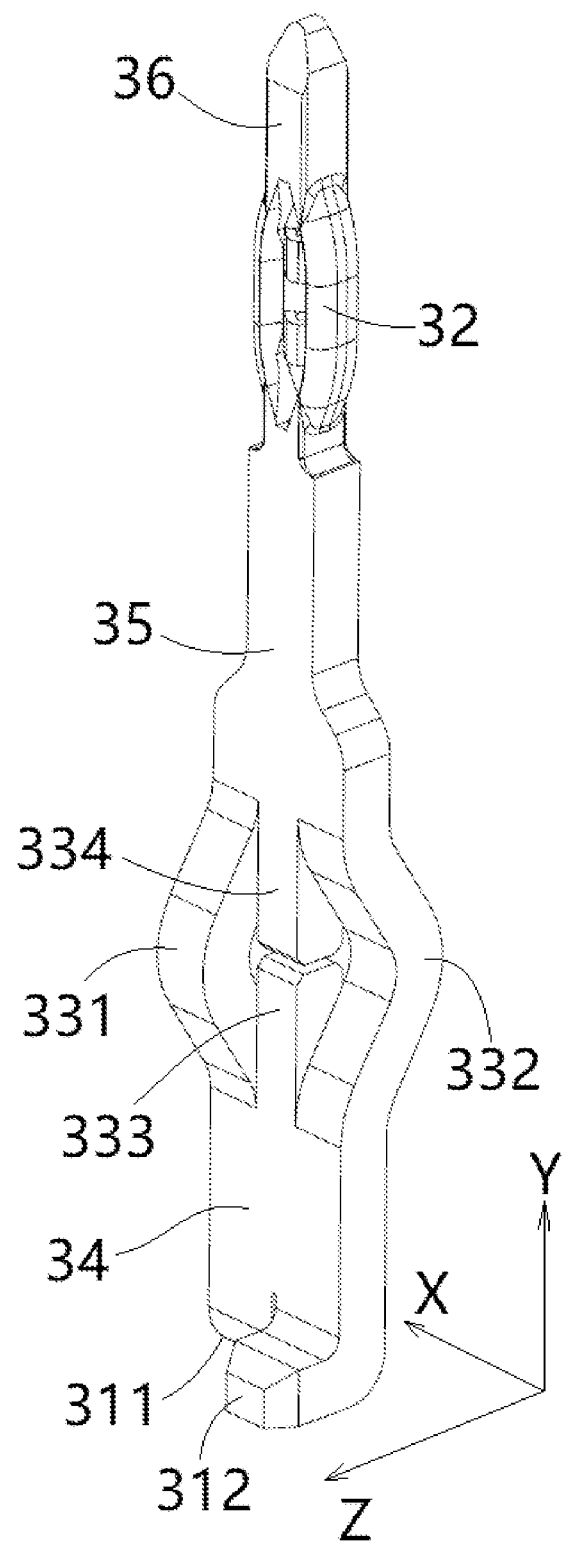
FIG. 3 is an illustrative perspective view of an electrical connection terminal according to an exemplary embodiment of the present invention when viewed from one direction.

As shown in FIG. 3, in the illustrated embodiments, the electrical connection terminal 3 has a first end (lower end in FIG. 3) and a second end (upper end in FIG. 3) opposite in its length direction Y. The welding part 31 and the press fitting part 32 are located at the first end and second end of the electrical connection terminal 3, respectively, as shown in FIG. 2.

Figure 4:
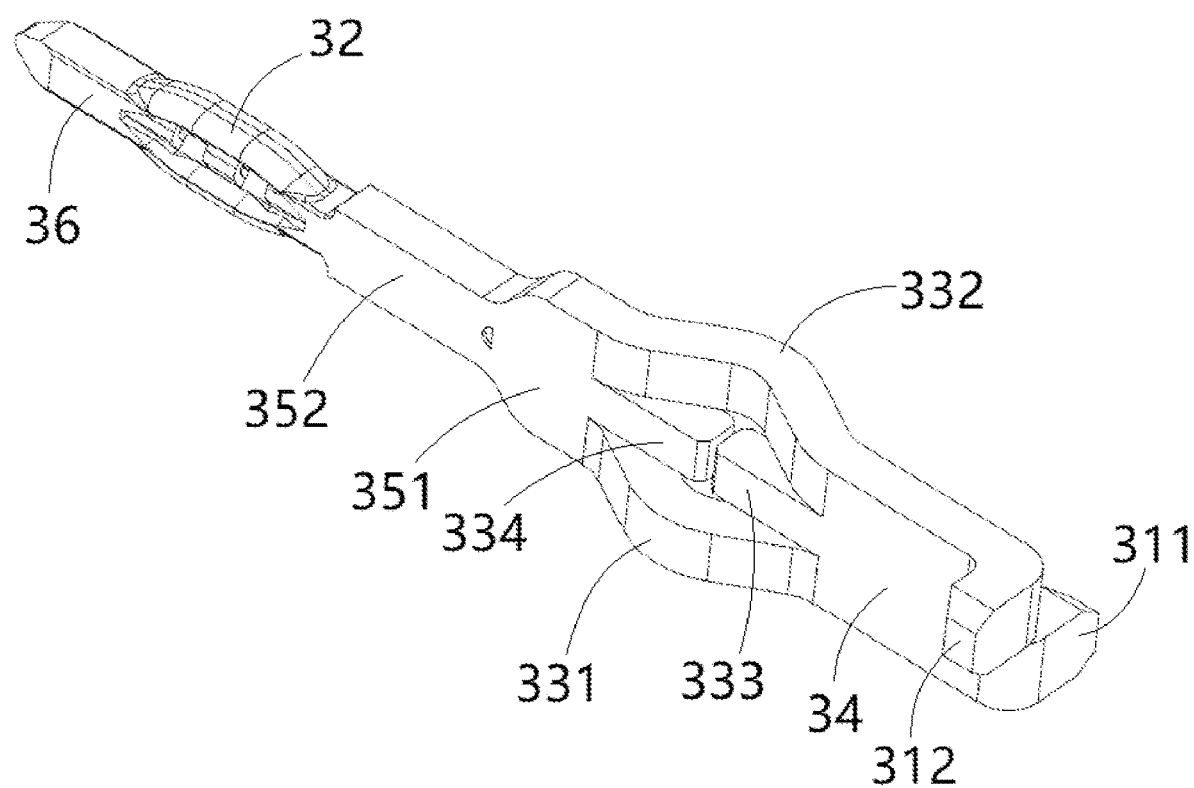
FIG. 4 is an illustrative perspective view of an electrical connection terminal according to an exemplary embodiment of the present invention when viewed from another direction.

As shown in FIGS. 3 and 4, in the illustrated embodiments, the welding part 31 includes a first welding foot 311 and a second welding foot 312. The first welding foot 311 and the second welding foot 312 are respectively located at both sides of the width direction X of the electrical connection terminal 3 and extend in opposite directions in the thickness direction Z of the electrical connection terminal 3.

In the illustrated embodiments, the first welding foot 311 and the second welding foot 312 have a flat bottom surface, and the bottom surface of the first welding foot 311 and the bottom surface of the second welding foot 312 are located in the same plane and welded to the surface of the solder pad 11 of the battery pack cell 10 in a surface mount manner.

As shown in FIGS. 3 and 4, in the illustrated embodiments, the elastic part 33 includes a first elastic arm 331 and a second elastic arm 332. The first elastic arm 331 and the second elastic arm 332 are respectively located at both sides of the width direction X of the electrical connection terminal 3 and are bent into arches in opposite directions in the thickness direction Z of the electrical connection terminal 3.

As shown in FIGS. 3 and 4, in the illustrated embodiments, the elastic part 33 further includes a first limit part 333 and a second limit part 334. The first limit part 333 and the second limit part 334 are spaced relative to each other by a predetermined distance in the length direction Y of the electrical connection terminal 3, in order to limit the maximum elastic deformation of the first elastic arm 331 and the second elastic arm 332, so that the maximum floating amount of the press fitting part 32 relative to the welding part 31 does not exceed a predetermined value. In the illustrated embodiments, the first limit part 333 and the second limit part 334 are located between the first elastic arm 331 and the second elastic arm 332 and extend along the length direction of the electrical connection terminal 3.

Figure 5:
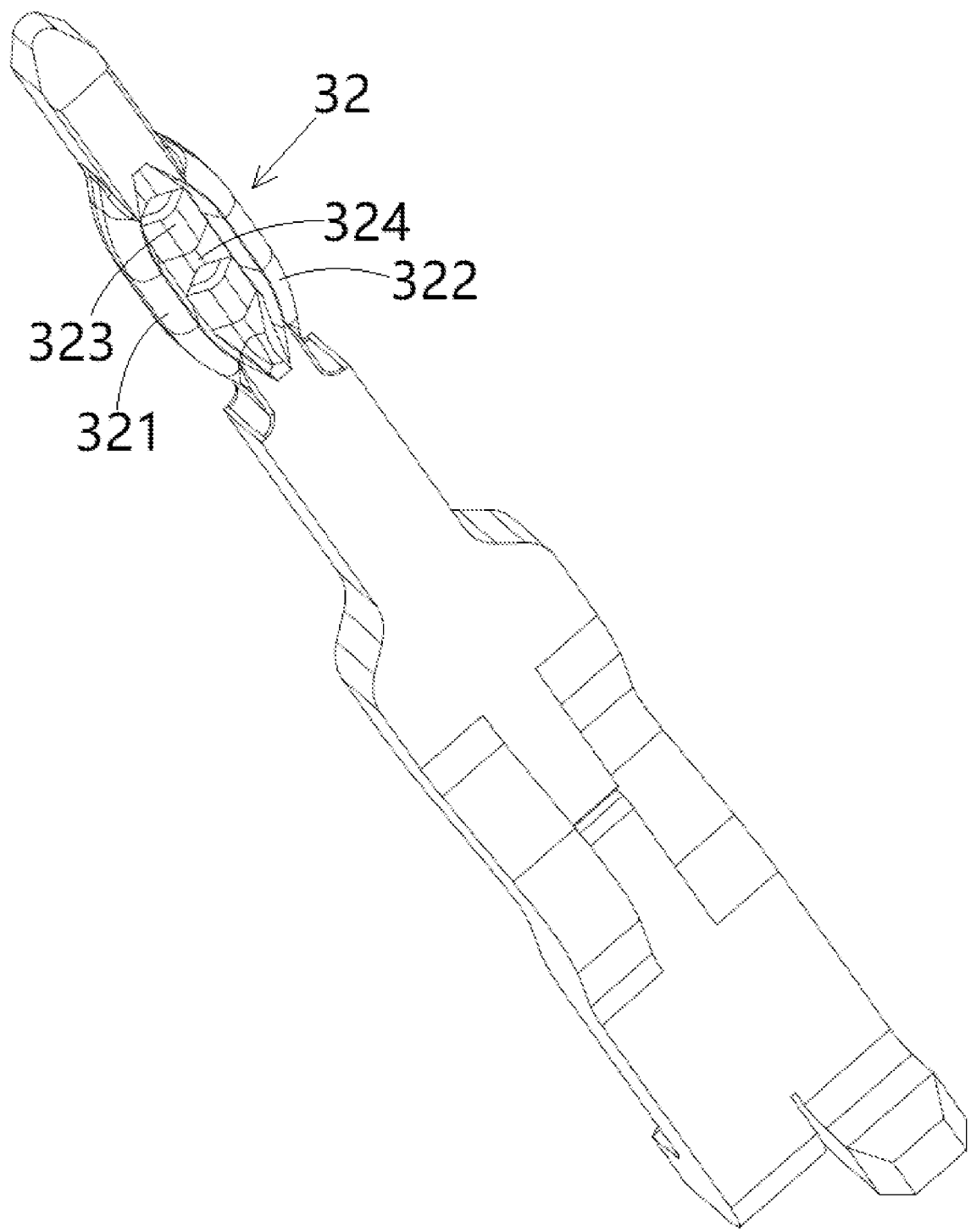
FIG. 5 is an illustrative perspective view of an electrical connection terminal according to an exemplary embodiment of the present invention when viewed from another direction.

As shown in FIG. 5, in the illustrated embodiments, the press fitting part 32 includes a first arc-shaped rib 321 and a second arc-shaped rib 322 opposite to each other in the width direction X of the electrical connection terminal 3. The two ends of the first arc-shaped rib 321 and the second arc-shaped rib 322 are connected to each other to form a fisheye shaped pressing structure. The fisheye shaped pressing structure is suitable for interference fit with the hole 21 on the battery pack signal acquisition board 2.

As shown in FIG. 5, in the illustrated embodiments, the press fitting part 32 further includes a first reinforcing rib 323 and a second reinforcing rib 324 connected between the first and second arc-shaped ribs 321 and 322. The first and second reinforcing ribs 323 and 324 are bent into arches in opposite directions in the thickness direction Z of the electrical connection terminal 3.

As shown in FIG. 4, in the illustrated embodiment, the electrical connection terminal 3 also includes a guide end part 36. The guide end part 36 is connected to the press fitting part 32 and extends a predetermined length from the press fitting part 32 along the length direction Y of the electrical connection terminal 3 to guide the press fitting part 32 into the hole 21 on the battery pack signal acquisition board 2.

As shown in FIGS. 3 and 4, in the illustrated embodiment, the electrical connection terminal 3 further includes a first connection part 34, which is in a plate shape and connected between the welding part 31 and the elastic part 33. In the illustrated embodiment, the size of the first connection part 34 in the width direction X of the electrical connection terminal 3 is equal to the size of the welding part 31 in the width direction X of the electrical connection terminal 3. The size of the first connection part 34 in the width direction X of the electrical connection terminal 3 is equal to the size of the elastic part 33 in the width direction X of the electrical connection terminal 3.

As shown in FIGS. 3 and 4, in the illustrated embodiment, the electrical connection terminal 3 further includes a second connection part 35, which is in a plate shape and connected between the elastic part 33 and the press fitting part 32. In the illustrated embodiment, the second connection part 35 includes: a first part 351 connected to the elastic part 33; and a second part 352 connected to the press fitting part 32. The first part 351 and the second part 352 are connected to each other, and the size of the first part 351 in the width direction X of the electrical connection terminal 3 is greater than the size of the second part 352 in the width direction X of the electrical connection terminal 3.

In the illustrated embodiments, the size of the first part 351 of the second connection part 35 in the width direction X of the electrical connection terminal 3 is equal to the size of the elastic part 33 in the width direction X of the electrical connection terminal 3. The size of the second part 352 of the second connection part 35 in the width direction X of the electrical connection terminal 3 is slightly larger than the size of the press fitting part 32 in the width direction X of the electrical connection terminal 3.

In the illustrated embodiment, the electrical connection terminal 3 is an integral stamped terminal formed by stamping a metal sheet. This can reduce manufacturing costs.

In another exemplary embodiment of the present invention, a battery pack signal acquisition device is also disclosed. The battery pack signal acquisition device includes a battery pack signal acquisition board 2 and an electrical connection terminal 3, as shown in FIGS. 1 and 2. A hole 21 is formed on the battery pack signal acquisition board 2. The press fitting part 32 of the electrical connection terminal 3 is pressed into the hole 21 on the battery pack signal acquisition board 2 to avoid welding, in order to achieve mechanical and electrical connection with the battery pack signal acquisition board 2. The welding part 31 of the electrical connection terminal 3 is used for welding to the solder pad 11 of the battery pack cell 10 to electrically connect with the battery pack cell 10.

As shown in FIG. 2, in the illustrated embodiment, multiple holes 21 are formed on the battery pack signal acquisition board 2, and the multiple holes 21 are arranged in an array with multiple rows and columns. The battery pack signal acquisition device includes multiple electrical connection terminals 3, which are respectively pressed into multiple holes 21.

In the aforementioned exemplary embodiments of the present invention, the battery pack cell and the battery pack signal acquisition board are electrically connected by the electrical connection terminal, which greatly shortens the data transmission path between the battery pack cell and the battery pack signal acquisition board, improves the reliability of signal acquisition, and can reduce the cost of the battery pack signal acquisition device.

In addition, in the aforementioned exemplary embodiments according to the present invention, the press fitting part of the electrical connection terminal is pressed onto the battery pack signal acquisition board in a welding free manner, which is very convenient to use. Moreover, the electrical connection terminal also has an elastic floating structure with shockproof buffer function, which can effectively prevent the electrical connection terminal from loosening due to vibration, ensuring the reliability of the electrical connection between the electrical connection terminal and the battery pack cell, as well as between the electrical connection terminal and the battery pack signal acquisition board.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features.

Moreover, unless explicitly stated to the contrary, embodiments "comprising" or "having" an element or a plurality of elements having a particular property may include additional such elements not having that property.

What is claimed is:

1. An electrical connection terminal, comprising:
a welding part welded to a solder pad of a battery pack cell to be electrically connected to the battery pack cell;
a press fitting part pressed into a hole on a battery pack signal acquisition board to be electrically connected to the battery pack signal acquisition board; and
an elastic part connected between the welding part and the press fitting part, the press fitting part is elastically floated in a length direction of the electrical connection terminal relative to the welding part.

2. The electrical connection terminal according to claim 1, wherein the electrical connection terminal has a first end and a second end opposite to the first end in the length direction, the welding part and the press fitting part are respectively located at the first end and second end of the electrical connection terminal.

3. The electrical connection terminal according to claim 1, wherein the welding part includes a first welding foot and a second welding foot, the first welding foot and the second welding foot are respectively located at a pair of sides of a width direction of the electrical connection terminal and extend in opposite directions in a thickness direction of the electrical connection terminal.

4. The electrical connection terminal according to claim 3, wherein the first welding foot and the second welding foot each have a flat bottom surface, the flat bottom surface of the first welding foot and the flat bottom surface of the second welding foot are located in a same plane and welded to a surface of the solder pad.

5. The electrical connection terminal according to claim 1, wherein the elastic part has a first elastic arm and a second elastic arm, the first elastic arm and the second elastic arm are respectively located at a pair of sides of a width direction of the electrical connection terminal and are bent into arches in opposite directions in a thickness direction of the electrical connection terminal.

6. The electrical connection terminal according to claim 5, wherein the elastic part includes a first limit part and a second limit part, the first limit part and the second limit part are spaced relative to each other by a predetermined distance in the length direction to limit a maximum elastic deformation of the first elastic arm and the second elastic arm, a maximum floating amount of the press fitting part relative to the welding part does not exceed a predetermined value.

7. The electrical connection terminal according to claim 6, wherein the first limit part and the second limit part are located between the first elastic arm and the second elastic arm and extend along the length direction of the electrical connection terminal.

8. The electrical connection terminal according to claim 1, wherein the press fitting part includes a first arc-shaped rib and a second arc-shaped rib opposite to each other in a width direction of the electrical connection terminal.

9. The electrical connection terminal according to claim 8, wherein a pair of ends of the first arc-shaped rib and the second arc-shaped rib are connected to each other to form a fisheye shaped pressure fitting structure, the fisheye shaped pressure fitting structure is interference fit with a hole on the battery pack signal acquisition board.

10. The electrical connection terminal according to claim 9, wherein the press fitting part includes a first reinforcing rib and a second reinforcing rib connected between the first arc-shaped rib and the second arc-shaped rib, the first reinforcing rib and the second reinforcing rib are bent into arches in opposite directions in a thickness direction of the electrical connection terminal.

11. The electrical connection terminal according to claim 1, further comprising a guide end part connected to the press fitting part and extending a predetermined length along the length direction of the electrical connection terminal to guide the press fitting part into a hole on the battery pack signal acquisition board.

12. The electrical connection terminal according to claim 1, further comprising a first connection part having a shape of a plate and connected between the welding part and the elastic part.

13. The electrical connection terminal according to claim 12, wherein:
a size of the first connection part in a width direction of the electrical connection terminal is equal to a size of the welding part in the width direction of the electrical connection terminal; and/or
the size of the first connection part in the width direction of the electrical connection terminal is equal to a size of the elastic part in the width direction of the electrical connection terminal.

14. The electrical connection terminal according to claim 12, further comprising a second connection part having a shape of a plate and connected between the elastic part and the press fitting part.

15. The electrical connection terminal according to claim 14, wherein the second connection part includes a first part connected to the elastic part and a second part connected to the press fitting part.

16. The electrical connection terminal according to claim 15, wherein the first part and the second part are connected to each other, and a size of the first part in the width direction of the electrical connection terminal is greater than a size of the second part in the width direction of the electrical connection terminal.

17. The electrical connection terminal according to claim 16, wherein:
the size of the first part in the width direction of the electrical connection terminal is equal to the size of the elastic part in the width direction of the electrical connection terminal; and/or
the size of the second part in the width direction of the electrical connection terminal is larger than a size of the press fitting part in the width direction of the electrical connection terminal.

18. The electrical connection terminal according to claim 1, wherein the electrical connection terminal is an integral stamped terminal formed by stamping a metal sheet.

19. A battery pack signal acquisition device, comprising:
a battery pack signal acquisition board, on which a hole is formed; and
an electrical connection terminal including a welding part welded to a solder pad of a battery pack cell to be electrically connected to the battery pack cell, a press fitting part pressed into the hole on the battery pack signal acquisition board to be electrically and mechanically connected to the battery pack signal acquisition board, and an elastic part connected between the welding part and the press fitting part, the press fitting part is elastically floated in a length direction of the electrical connection terminal relative to the welding part.

20. The battery pack signal acquisition device according to claim 19, wherein the hole is one of a plurality of holes formed on the battery pack signal acquisition board, the plurality of holes are arranged in an array with multiple rows and columns, the electrical connection terminal is one of a plurality of electrical connection terminals respectively pressed into the plurality of holes.

* * * * *